US 10,572,445 B2

(12) United States Patent
Lad

(10) Patent No.: US 10,572,445 B2
(45) Date of Patent: Feb. 25, 2020

(54) TRANSFERRING OR MIGRATING PORTIONS OF DATA OBJECTS, SUCH AS BLOCK-LEVEL DATA MIGRATION OR CHUNK-BASED DATA MIGRATION

(71) Applicant: CommVault Systems, Inc., Oceanport, NJ (US)

(72) Inventor: Kamleshkumar K. Lad, Dublin, CA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 1053 days.

(21) Appl. No.: 14/132,458

(22) Filed: Dec. 18, 2013

(65) Prior Publication Data

US 2014/0108470 A1    Apr. 17, 2014

Related U.S. Application Data

(62) Division of application No. 12/553,199, filed on Sep. 3, 2009, now abandoned.

(Continued)

(51) Int. Cl.
| | | |
|---|---|---|
| *G06F 16/00* | (2019.01) | |
| *G06F 16/13* | (2019.01) | |
| *G06F 16/11* | (2019.01) | |

(52) U.S. Cl.
CPC ............ *G06F 16/13* (2019.01); *G06F 16/119* (2019.01)

(58) Field of Classification Search
CPC ......... G06F 17/30864; G06F 17/30371; G06F 17/30088; G06F 17/30076; G06F 17/3007;

(Continued)

(56) References Cited

U.S. PATENT DOCUMENTS

| | | |
|---|---|---|
| 4,464,122 A | 8/1984 | Fuller et al. |
| 4,686,620 A | 8/1987 | Ng |

(Continued)

FOREIGN PATENT DOCUMENTS

| | | |
|---|---|---|
| EP | 0259912 A1 | 3/1988 |
| EP | 0405926 A2 | 1/1991 |

(Continued)

OTHER PUBLICATIONS

Hirofuchi, Takahiro, et al. "A live storage migration mechanism over wan for relocatable virtual machine services on clouds." Proceedings of the 2009 9th IEEE/ACM International Symposium on Cluster Computing and the Grid. IEEE Computer Society, 2009.*

(Continued)

*Primary Examiner* — Nan Hutton
(74) *Attorney, Agent, or Firm* — Perkins Coie LLP

(57) ABSTRACT

A system and method for migrating data objects based on portions of the data objects is described. The system may transfer portions of files, folders, and other data objects from primary storage to secondary storage based on certain criteria, such as time-based criteria, age-based criteria, and so on. An increment may be one or more blocks of a data object, or one or more chunks of a data object, or other segments that combine to form or store a data object. For example, the system identifies one or more blocks of a data object that satisfy a certain criteria, and migrates the identified blocks. The system may determine that a certain number of blocks of a file have not been modified or called by a file system in a certain time period, and migrate these blocks to secondary storage.

17 Claims, 10 Drawing Sheets

Related U.S. Application Data

(60) Provisional application No. 61/096,587, filed on Sep. 12, 2008.

(58) Field of Classification Search
CPC ......... G06F 17/30073; G06F 17/30079; G06F 17/30067; G06F 17/301; G06F 17/3012; G06F 16/27; G06F 16/113; G06F 16/184; G06F 16/1727; G06F 16/275; G06F 16/21; G06F 16/214; G06F 16/1748; G06F 16/1827; G06F 16/2282; G06F 16/2358; G06F 16/119
See application file for complete search history.

(56) References Cited

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,212,784 A | 5/1993 | Sparks |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,386,545 A | 1/1995 | Gombos, Jr. et al. |
| 5,410,700 A | 4/1995 | Fecteau et al. |
| 5,448,718 A | 9/1995 | Cohn et al. |
| 5,448,724 A | 9/1995 | Hayashi |
| 5,485,606 A | 1/1996 | Midgdey et al. |
| 5,491,810 A | 2/1996 | Allen |
| 5,495,607 A | 2/1996 | Pisello et al. |
| 5,504,873 A | 4/1996 | Martin et al. |
| 5,517,405 A | 5/1996 | McAndrew et al. |
| 5,537,568 A | 7/1996 | Yanai et al. |
| 5,544,345 A | 8/1996 | Carpenter et al. |
| 5,544,347 A | 8/1996 | Yanai et al. |
| 5,555,371 A | 9/1996 | Duyanovich et al. |
| 5,559,957 A | 9/1996 | Balk |
| 5,564,037 A | 10/1996 | Lam |
| 5,608,865 A | 3/1997 | Midgely et al. |
| 5,613,134 A | 3/1997 | Lucus et al. |
| 5,619,644 A | 4/1997 | Crockett et al. |
| 5,634,052 A | 5/1997 | Morris |
| 5,638,509 A | 6/1997 | Dunphy et al. |
| 5,659,614 A | 8/1997 | Bailey, III |
| 5,666,501 A | 9/1997 | Jones et al. |
| 5,673,381 A | 9/1997 | Huai et al. |
| 5,673,382 A | 9/1997 | Cannon et al. |
| 5,699,361 A | 12/1997 | Ding et al. |
| 5,729,743 A | 3/1998 | Squibb |
| 5,740,405 A | 4/1998 | DeGraaf |
| 5,751,997 A | 5/1998 | Kullick et al. |
| 5,758,359 A | 5/1998 | Saxon |
| 5,758,649 A | 6/1998 | Iwashita et al. |
| 5,761,677 A | 6/1998 | Senator et al. |
| 5,764,972 A | 6/1998 | Crouse et al. |
| 5,778,165 A | 7/1998 | Saxon |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,860,073 A | 1/1999 | Ferrel et al. |
| 5,864,846 A | 1/1999 | Voorhees et al. |
| 5,875,478 A | 2/1999 | Blumenau |
| 5,887,134 A | 3/1999 | Ebrahim |
| 5,896,531 A | 4/1999 | Curtis et al. |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 5,983,239 A | 11/1999 | Cannon |
| 5,991,753 A | 11/1999 | Wilde |
| 6,012,053 A | 1/2000 | Pant et al. |
| 6,021,415 A | 2/2000 | Cannon et al. |
| 6,026,414 A | 2/2000 | Anglin |
| 6,052,735 A | 4/2000 | Ulrich et al. |
| 6,064,821 A | 5/2000 | Shough et al. |
| 6,073,128 A | 6/2000 | Pongracz et al. |
| 6,076,148 A | 6/2000 | Kedem |
| 6,091,518 A | 7/2000 | Anabuki et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,182,198 B1 | 1/2001 | Hubis et al. |
| 6,212,512 B1 | 4/2001 | Barney et al. |
| 6,226,759 B1 | 5/2001 | Miller et al. |
| 6,239,800 B1 | 5/2001 | Mayhew et al. |
| 6,253,217 B1 | 6/2001 | Dourish et al. |
| 6,260,069 B1 | 7/2001 | Anglin |
| 6,266,679 B1 | 7/2001 | Szalwinski et al. |
| 6,266,784 B1 | 7/2001 | Hsiao et al. |
| 6,269,431 B1 | 7/2001 | Dunham |
| 6,275,953 B1 | 8/2001 | Vahalia et al. |
| 6,298,439 B1 | 10/2001 | Beglin |
| 6,301,592 B1 | 10/2001 | Aoyama et al. |
| 6,308,175 B1 | 10/2001 | Lang et al. |
| 6,324,581 B1 | 11/2001 | Xu et al. |
| 6,327,590 B1 | 12/2001 | Chidlovskii et al. |
| 6,327,612 B1 | 12/2001 | Watanabe et al. |
| 6,328,766 B1 | 12/2001 | Long |
| 6,330,570 B1 | 12/2001 | Crighton |
| 6,330,642 B1 | 12/2001 | Carteau |
| 6,341,287 B1 | 1/2002 | Sziklai |
| 6,343,287 B1 | 1/2002 | Kumar et al. |
| 6,343,324 B1 | 1/2002 | Hubis et al. |
| 6,345,288 B1 | 2/2002 | Reed et al. |
| RE37,601 E | 3/2002 | Eastridge et al. |
| 6,356,801 B1 | 3/2002 | Goodman et al. |
| 6,363,462 B1 | 3/2002 | Bergsten |
| 6,367,073 B2 | 4/2002 | Elledge |
| 6,374,363 B1 | 4/2002 | Wu et al. |
| 6,389,432 B1 | 5/2002 | Pothapragada et al. |
| 6,418,478 B1 | 7/2002 | Ignatius et al. |
| 6,421,678 B2 | 7/2002 | Smiga et al. |
| 6,421,711 B1 | 7/2002 | Blumenau et al. |
| 6,442,706 B1 | 8/2002 | Wahl et al. |
| 6,470,332 B1 | 10/2002 | Weschler |
| 6,484,162 B1 | 11/2002 | Edlund et al. |
| 6,487,561 B1 | 11/2002 | Ofek et al. |
| 6,487,644 B1 | 11/2002 | Huebsch et al. |
| 6,502,205 B1 | 12/2002 | Yanai et al. |
| 6,519,679 B2 | 2/2003 | Devireddy et al. |
| 6,538,669 B1 | 3/2003 | Lagueux, Jr. et al. |
| 6,540,623 B2 | 4/2003 | Jackson |
| 6,549,918 B1 | 4/2003 | Probert, Jr. et al. |
| 6,557,039 B1 | 4/2003 | Leong et al. |
| 6,564,228 B1 | 5/2003 | O'Connor |
| 6,593,656 B2 | 7/2003 | Ahn et al. |
| 6,618,771 B1 | 9/2003 | Leja et al. |
| 6,629,110 B2 | 9/2003 | Cane et al. |
| 6,647,399 B2 | 11/2003 | Zaremba |
| 6,658,526 B2 | 12/2003 | Nguyen et al. |
| 6,662,218 B2 | 12/2003 | Mighdoll et al. |
| 6,675,177 B1 | 1/2004 | Webb |
| 6,691,232 B1 | 2/2004 | Wood et al. |
| 6,721,767 B2 | 4/2004 | De Meno et al. |
| 6,732,088 B1 | 5/2004 | Glance |
| 6,732,231 B1 | 5/2004 | Don et al. |
| 6,732,244 B2 | 5/2004 | Ashton et al. |
| 6,745,178 B1 | 6/2004 | Goldring |
| 6,795,828 B2 | 9/2004 | Ricketts |

(56) References Cited

U.S. PATENT DOCUMENTS

| | | |
|---|---|---|
| 6,816,941 B1 | 11/2004 | Carlson et al. |
| 6,820,070 B2 | 11/2004 | Goldman et al. |
| 6,839,741 B1 | 1/2005 | Tsai |
| 6,839,803 B1 | 1/2005 | Loh et al. |
| 6,850,994 B2 | 2/2005 | Gabryjelski |
| 6,860,422 B2 | 3/2005 | Hull et al. |
| 6,865,568 B2 | 3/2005 | Chau |
| 6,871,182 B1 | 3/2005 | Winnard et al. |
| 6,892,221 B2 | 5/2005 | Ricart et al. |
| 6,948,038 B2 | 9/2005 | Berkowitz et al. |
| 6,948,039 B2 | 9/2005 | Biessener et al. |
| 6,957,186 B1 | 10/2005 | Guheen et al. |
| 6,970,997 B2 | 11/2005 | Shibayama et al. |
| 6,976,039 B2 | 12/2005 | Chefalas et al. |
| 6,995,675 B2 | 2/2006 | Curkendall et al. |
| 6,996,616 B1 | 2/2006 | Leighton et al. |
| 7,003,641 B2 | 2/2006 | Prahlad et al. |
| 7,028,079 B2 | 4/2006 | Mastrianni et al. |
| 7,035,880 B1 | 4/2006 | Crescenti et al. |
| 7,039,860 B1 | 5/2006 | Gautestad et al. |
| 7,054,960 B1* | 5/2006 | Bezbaruah .......... G06F 11/2071 710/33 |
| 7,058,661 B2 | 6/2006 | Ciaramitaro et al. |
| 7,099,901 B2 | 8/2006 | Sutoh et al. |
| 7,107,298 B2 | 9/2006 | Prahlad et al. |
| 7,107,416 B2 | 9/2006 | Stuart et al. |
| 7,133,870 B1 | 11/2006 | Tripp et al. |
| 7,139,826 B2 | 11/2006 | Watanabe et al. |
| 7,139,846 B1 | 11/2006 | Rossi |
| 7,146,387 B1 | 12/2006 | Russo et al. |
| 7,155,421 B1 | 12/2006 | Haldar |
| 7,155,481 B2 | 12/2006 | Prahlad et al. |
| 7,159,081 B2 | 1/2007 | Suzuki |
| 7,171,468 B2 | 1/2007 | Yeung et al. |
| 7,171,585 B2 | 1/2007 | Gail et al. |
| 7,185,152 B2 | 2/2007 | Takahashi et al. |
| 7,188,141 B2 | 3/2007 | Novaes |
| 7,240,100 B1 | 7/2007 | Wein et al. |
| 7,246,207 B2 | 7/2007 | Kottomtharayil et al. |
| 7,269,664 B2 | 9/2007 | Hutsch et al. |
| 7,284,033 B2 | 10/2007 | Jhanji |
| 7,287,047 B2 | 10/2007 | Kavuri |
| 7,290,017 B1 | 10/2007 | Wang et al. |
| 7,313,659 B2 | 12/2007 | Suzuki |
| 7,315,923 B2 | 1/2008 | Retnamma et al. |
| 7,328,325 B1 | 2/2008 | Solis et al. |
| 7,343,453 B2 | 3/2008 | Prahlad et al. |
| 7,346,623 B2 | 3/2008 | Prahlad et al. |
| 7,346,676 B1 | 3/2008 | Swildens et al. |
| 7,346,751 B2 | 3/2008 | Prahlad et al. |
| 7,376,947 B2 | 5/2008 | Evers |
| 7,379,978 B2 | 5/2008 | Anderson et al. |
| 7,383,379 B2 | 6/2008 | Patterson et al. |
| 7,386,535 B1 | 6/2008 | Kalucha et al. |
| 7,395,282 B1 | 7/2008 | Crescenti et al. |
| 7,421,460 B2 | 9/2008 | Chigusa et al. |
| 7,424,543 B2 | 9/2008 | Rice, III |
| 7,434,219 B2 | 10/2008 | De Meno et al. |
| 7,457,790 B2 | 11/2008 | Kochunni et al. |
| 7,472,142 B2 | 12/2008 | Prahlad et al. |
| 7,496,841 B2 | 2/2009 | Hadfield et al. |
| 7,529,782 B2 | 5/2009 | Prahlad et al. |
| 7,565,484 B2 | 7/2009 | Ghosal et al. |
| 7,577,689 B1 | 8/2009 | Masinter et al. |
| 7,577,694 B2 | 8/2009 | Nakano et al. |
| 7,584,469 B2 | 9/2009 | Mitekura et al. |
| 7,587,715 B1 | 9/2009 | Barrett et al. |
| 7,593,935 B2 | 9/2009 | Sullivan |
| 7,596,713 B2 | 9/2009 | Mani-Meitav et al. |
| 7,603,626 B2 | 10/2009 | Williams et al. |
| 7,606,844 B2 | 10/2009 | Kottomtharayil |
| 7,610,285 B1 | 10/2009 | Zoellner et al. |
| 7,617,262 B2 | 11/2009 | Prahlad et al. |
| 7,668,884 B2 | 2/2010 | Prahlad et al. |
| 7,673,175 B2 | 3/2010 | Mora et al. |
| 7,676,542 B2 | 3/2010 | Moser et al. |
| 7,689,899 B2 | 3/2010 | Leymaster et al. |
| 7,730,031 B2 | 6/2010 | Forster |
| 7,734,593 B2 | 6/2010 | Prahlad et al. |
| 7,734,669 B2 | 6/2010 | Kottomtharayil et al. |
| 7,747,579 B2 | 6/2010 | Prahlad et al. |
| 7,751,628 B1 | 7/2010 | Reisman |
| 7,761,409 B2 | 7/2010 | Stefik et al. |
| 7,792,789 B2 | 9/2010 | Prahlad et al. |
| 7,801,871 B2 | 9/2010 | Gosnell |
| 7,814,118 B2 | 10/2010 | Kottomtharayil et al. |
| 7,827,266 B2 | 11/2010 | Gupta |
| 7,831,793 B2 | 11/2010 | Chakravarty et al. |
| 7,840,537 B2 | 11/2010 | Gokhale et al. |
| 7,844,676 B2 | 11/2010 | Prahlad et al. |
| 7,865,517 B2 | 1/2011 | Prahlad et al. |
| 7,882,077 B2 | 2/2011 | Gokhale et al. |
| 7,882,093 B2 | 2/2011 | Kottomtharayil et al. |
| 7,882,097 B1 | 2/2011 | Ogilvie |
| 7,937,393 B2 | 5/2011 | Prahlad et al. |
| 7,937,420 B2 | 5/2011 | Tabellion et al. |
| 7,937,702 B2 | 5/2011 | De Meno et al. |
| 7,984,063 B2 | 7/2011 | Kottomtharayil et al. |
| 8,037,028 B2 | 10/2011 | Prahlad et al. |
| 8,055,627 B2 | 11/2011 | Prahlad et al. |
| 8,060,514 B2 | 11/2011 | Arrouye et al. |
| 8,078,607 B2 | 12/2011 | Oztekin et al. |
| 8,099,428 B2 | 1/2012 | Kottomtharayil et al. |
| 8,108,427 B2 | 1/2012 | Prahlad et al. |
| 8,117,173 B2* | 2/2012 | Gurevich .......... G06F 17/30194 707/693 |
| 8,140,786 B2 | 3/2012 | Bunte et al. |
| 8,156,086 B2 | 4/2012 | Lu et al. |
| 8,161,003 B2 | 4/2012 | Kavuri |
| 8,170,995 B2 | 5/2012 | Prahlad et al. |
| 8,219,524 B2 | 7/2012 | Gokhale |
| 8,229,954 B2 | 7/2012 | Kottomtharayil et al. |
| 8,230,195 B2 | 7/2012 | Amarendran et al. |
| RE43,678 E | 9/2012 | Major et al. |
| 8,285,681 B2 | 10/2012 | Prahlad et al. |
| 8,352,954 B2 | 1/2013 | Gokhale et al. |
| 8,364,652 B2 | 1/2013 | Vijayan et al. |
| 8,578,120 B2 | 11/2013 | Attarde et al. |
| 2002/0032878 A1 | 3/2002 | Karpf |
| 2002/0049883 A1 | 4/2002 | Schneider et al. |
| 2002/0120858 A1 | 8/2002 | Porter et al. |
| 2003/0046313 A1 | 3/2003 | Leung et al. |
| 2003/0050979 A1 | 3/2003 | Takahashi |
| 2003/0101086 A1 | 5/2003 | San Miguel |
| 2004/0039689 A1 | 2/2004 | Penney et al. |
| 2004/0220980 A1* | 11/2004 | Forster ............... G06F 11/1451 |
| 2004/0267815 A1 | 12/2004 | De Mes |
| 2005/0039069 A1 | 2/2005 | Prahlad et al. |
| 2005/0091346 A1* | 4/2005 | Krishnaswami .... G06F 9/44505 709/220 |
| 2005/0097070 A1 | 5/2005 | Enis et al. |
| 2005/0251786 A1 | 11/2005 | Citron et al. |
| 2005/0278207 A1 | 12/2005 | Ronnewinkel |
| 2006/0036619 A1 | 2/2006 | Fuerst et al. |
| 2006/0070061 A1 | 3/2006 | Cox et al. |
| 2006/0115802 A1 | 6/2006 | Reynolds |
| 2006/0116999 A1 | 6/2006 | Dettinger et al. |
| 2006/0149604 A1 | 7/2006 | Miller |
| 2006/0149724 A1 | 7/2006 | Ritter et al. |
| 2006/0224846 A1 | 10/2006 | Amarendran et al. |
| 2006/0265396 A1 | 11/2006 | Raman et al. |
| 2006/0282900 A1 | 12/2006 | Johnson et al. |
| 2007/0022145 A1 | 1/2007 | Kavuri |
| 2007/0028229 A1 | 2/2007 | Knatcher |
| 2007/0043715 A1 | 2/2007 | Kaushik et al. |
| 2007/0061266 A1 | 3/2007 | Moore et al. |
| 2007/0061298 A1 | 3/2007 | Wilson et al. |
| 2007/0136541 A1 | 6/2007 | Herz et al. |
| 2007/0156783 A1 | 7/2007 | Zbogar-Smith et al. |
| 2007/0166674 A1 | 7/2007 | Kochunni et al. |
| 2007/0185915 A1 | 8/2007 | Prahlad et al. |
| 2007/0208788 A1* | 9/2007 | Chakravarty ....... G06F 11/1451 |
| 2007/0214330 A1* | 9/2007 | Minami ............. G06F 11/1458 711/162 |

(56) References Cited

U.S. PATENT DOCUMENTS

| | | |
|---|---|---|
| 2007/0226320 A1 | 9/2007 | Hager et al. |
| 2007/0250810 A1 | 10/2007 | Tittizer et al. |
| 2007/0296258 A1 | 12/2007 | Calvert et al. |
| 2008/0126302 A1 | 5/2008 | Mora et al. |
| 2008/0282048 A1 | 11/2008 | Miura |
| 2008/0288947 A1 | 11/2008 | Gokhale et al. |
| 2008/0288948 A1 | 11/2008 | Attarde et al. |
| 2008/0320319 A1 | 12/2008 | Muller et al. |
| 2009/0171883 A1 | 7/2009 | Kochunni et al. |
| 2009/0319534 A1 | 12/2009 | Gokhale |
| 2009/0320029 A1 | 12/2009 | Kottomtharayil |
| 2009/0320033 A1 | 12/2009 | Gokhale et al. |
| 2010/0005259 A1* | 1/2010 | Prahlad ............... G06F 11/1435 711/162 |
| 2010/0031017 A1 | 2/2010 | Gokhale et al. |
| 2010/0070466 A1 | 3/2010 | Prahlad et al. |
| 2010/0070474 A1 | 3/2010 | Lad |
| 2010/0070725 A1 | 3/2010 | Prahlad et al. |
| 2010/0070726 A1 | 3/2010 | Ngo et al. |
| 2010/0076932 A1 | 3/2010 | Lad |
| 2010/0114837 A1 | 5/2010 | Prahlad et al. |
| 2010/0332456 A1 | 12/2010 | Prahlad et al. |
| 2011/0093471 A1 | 4/2011 | Brockway et al. |
| 2011/0138225 A1 | 6/2011 | Gunabalasubramaniam et al. |
| 2011/0173171 A1 | 7/2011 | De Meno et al. |
| 2012/0036108 A1 | 2/2012 | Prahlad et al. |
| 2012/0150818 A1 | 6/2012 | Vijayan Retnamma et al. |
| 2012/0150826 A1 | 6/2012 | Vijayan Retnamma et al. |
| 2012/0254119 A1 | 10/2012 | Kumarasamy et al. |
| 2012/0265754 A1 | 10/2012 | Kottomtharayil et al. |
| 2012/0317085 A1 | 12/2012 | Green et al. |
| 2013/0145376 A1 | 6/2013 | Gokhale et al. |
| 2013/0262410 A1 | 10/2013 | Liu et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0910019 A2 | 4/1999 |
| EP | 0981090 A1 | 2/2000 |
| EP | 0986011 | 3/2000 |
| EP | 1035690 | 9/2000 |
| GB | 2216368 A | 10/1989 |
| JP | 07-046271 A | 2/1995 |
| JP | 7073080 A | 3/1995 |
| JP | 8044598 A | 2/1996 |
| JP | 2000035969 | 2/2000 |
| JP | 2003531435 | 10/2003 |
| WO | WO-9513580 A1 | 5/1995 |
| WO | WO-9912098 A1 | 3/1999 |
| WO | WO-00/58865 | 10/2000 |
| WO | WO-0106368 A1 | 1/2001 |
| WO | WO-01/16693 | 3/2001 |
| WO | WO-0180005 | 10/2001 |

OTHER PUBLICATIONS

Cao, Lin, et al. "Hybrid caching for cloud storage to support traditional application." 2012 IEEE Asia Pacific Cloud Computing Congress (APCloudCC). IEEE, 2012.*
U.S. Appl. No. 09/609,977, Prahlad.
Microsoft Press Computer Dictionary Third Edition, "Data Compression," Microsoft Press, 1997, p. 130.
Hennessy et al., "Computer Architecture—A Quantitative Approach", 2nd Edition, 1996, pp. 246-250.
Veeravalli, B., "Network Caching Strategies for a Shared Data Distribution for a Predefined Service Demand Sequence," IEEE Transactions on Knowledge and Data Engineering, vol. 15, No. 6, Nov./Dec. 2003, pp. 1487-1497.
Armstead et al., "Implementation of a Campwide Distributed Mass Storage Service: The Dream vs. Reality," IEEE, Sep. 11-14, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," *IEEE*, Jun. 12-16, 1994, pp. 124-126.
Jander, M., "Launching Storage-Area Net," *Data Communications*, US, McGraw Hill, NY, vol. 27, No. 4 (Mar. 21, 1998), pp. 64-72.
Gait, J., "The Optical File Cabinet: A Random-Access File System for Write-Once Optical Disks," *IEEE Computer*, vol. 21, No. 6, pp. 11-22 (Jun. 1988).
Rosenblum et al., "The Design and Implementation of a Log-Structured File System," *Operating Systems Review SIGOPS*, vol. 25, No. 5, New York, US, pp. 1-15 (May 1991).
Hutchinson, Norman C., et al. "Logical vs. physical file system backup." OSDI. vol. 99. 1999.
Matthews, Jeanna, et al. "Data protection and rapid recovery from attack with a virtual private file server and virtual machine appliances." Proceedings of the IASTED International Conference on Communication, Network and Information Security (CNIS 2005). 2005.
Wu, Chin-Hsien, Tei-Wei Kuo, and Li-Pin Chang. "Efficient initialization and crash recovery for log-based file systems over flash memory." Proceedings of the 2006 ACM symposium on Applied computing. ACM, 2006.
Extended European Search Report for Application No. EP09767119, dated Feb. 11, 2013, 12 pages.
PCT International Search Report for International Application No. PCT/US09/32325, dated Mar. 17, 2009, 11 pages.
Pitoura et al., "Locating Objects in Mobile Computing", IEEE Transactions on Knowledge and Data Engineering, vol. 13, No. 4, Jul./Aug. 2001, pp. 571-592.
Rowe et al., "Indexes for User Access to Large Video Databases", Storage and Retrieval for Image and Video Databases II, IS,& T/SPIE Symp. on Elec. Imaging Sci. & Tech., Feb. 1994, pp. 1-12.
"Multi Instancing," retrieved from http://documentation.commvault.com/hds/release_8_0_0/books_online_1/english_us/deployment/install/misc/multi_instancing.htm[Feb. 18, 2014 11:57:19 AM] on Feb. 18, 2014, 3 pages.
Hutchinson, Norman C., et al. "Logical vs. physical file system backup." OSDI. vol. 99. 1999, 12 pages.
Matthews, Jeanna, et al. "Data protection and rapid recovery from attack with a virtual private file server and virtual machine appliances." Proceedings of the IASTED International Conference on Communication, Network and Information Security (CNIS 2005). 2005, 14 pages.
Quinlan, Sean. "A cached worm file system." Software: Practice and Experience 21.12 (1991 ): 1289-1299.
Wu, Chin-Hsien, Tei-Wei Kuo, and Li-Pin Chang. "Efficient initialization and crash recovery for log-based file systems over flash memory." Proceedings of the 2006 ACM symposium on Applied computing. ACM, 2006, 5 pages.

* cited by examiner

TRANSFERRING OR MIGRATING PORTIONS OF DATA OBJECTS, SUCH AS BLOCK-LEVEL DATA MIGRATION OR CHUNK-BASED DATA MIGRATION

CROSS REFERENCE TO RELATED APPLICATIONS

This application is a continuation of U.S. patent application Ser. No. 14/553,199, filed Sep. 3, 2009, entitled TRANSFERRING OR MIGRATING PORTIONS OF DATA OBJECTS, SUCH AS BLOCK-LEVEL DATA MIGRATION OR CHUNK-BASED DATA MIGRATION, which claims priority to U.S. Patent Application No. 61/096,587, filed on Sep. 12, 2008, entitled TRANSFERRING OR MIGRATING PORTIONS OF DATA OBJECTS, SUCH AS BLOCK-LEVEL DATA MIGRATION OR CHUNK-BASED DATA MIGRATION, each of which is incorporated by reference in its entirety.

BACKGROUND

Data storage systems contain large amounts of data. This data includes personal data, such as financial data, customer/client/patient contact data, audio/visual data, and much more. Computer systems often contain word processing documents, engineering diagrams, spreadsheets, business strategy presentations, email mailboxes, and so on. With the proliferation of computer systems and the ease of creating content, the amount of content in an organization has expanded rapidly. Even small offices often have more information stored than any single employee can know about or locate.

To that end, both companies and individuals rely on data storage systems to store, protect, and/or hold old data, such as data no longer actively needed. Often, these data storage systems perform data migration, moving data from primary storage (containing actively needed data) to secondary storage (such as backup storage or archives). Typical data storage systems transfer data in the forms of files, folders, and so on. For example, the typical data storage system may transfer data from a data store associated with a user to secondary storage while maintaining the structure and application format of the files themselves.

To restore the data, these systems then require knowledge of applications that create the data. Additionally, some files, can be very large, and restoring a large file can be costly, time consuming, and resource intensive.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Overview

Figure 1:
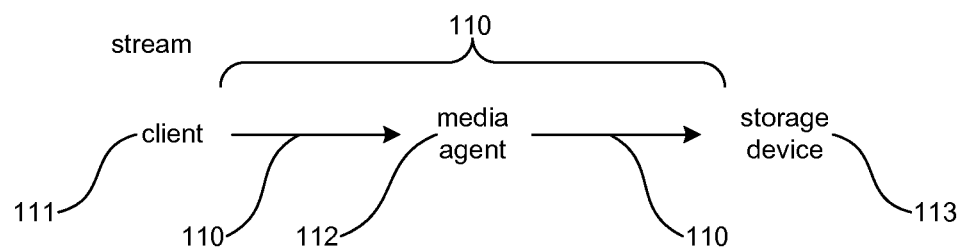
FIG. 1 is a block diagram illustrating components of a data stream utilized by a suitable data storage system.

Described in detail herein is a system and method that transfers or migrates data objects (such as files, folders, data stores, and/or discrete data component(s) by migrating segments, portions, increments, or proper subsets of the data objects. The system may transfer increments of files, folders, and other data objects from primary storage (or other sources) to secondary storage based on certain criteria, such as time-based criteria, age-based criteria, and so on. An increment may be one or more blocks of a data object, or one or more chunks of a data object, or other portions that combine to form, store, and/or contain a data object, such as a file.

In some examples, the system performs block-based migration of data. That is, the system identifies one or more blocks of a data object that satisfy a certain criteria, and migrates the identified blocks. For example, the system may determine that a certain number of blocks of a file have not been modified or called by a file system within a certain time period, and migrate these blocks to secondary storage. The system then maintains the other blocks of the file in primary storage. In some cases, the system automatically migrates data without requiring user input. Additionally, the migration may be transparent to a user.

In some examples, the system performs chunk-based migration of data. A chunk is, for example, a group or set of blocks. One or more chunks may comprise a file, folder, or other data object. The system identifies one or more chunks of a data object that satisfy a certain criteria, and migrates the identified chunks. For example, the system may determine that a certain number of chunks of a file have not been modified or called by a file system in a certain time period, and migrate these chunks to secondary storage. The system then maintains the other chunks of the file in primary storage. Further details regarding chunks and chunk-based storage may be found in U.S. Patent Application No. 61/180,791, entitled BLOCK-LEVEL SINGLE INSTANCING, filed May 22, 2009.

In some examples, the system leverages the block-based or chunk-based data migration in order to restore portions of data objects without restoring entire data objects. For example, the system can restore one or more blocks of a file, present the data contained by the blocks, receive modifications to the data, and update the blocks, and hence the file.

The system will now be described with respect to various examples. The following description provides specific details for a thorough understanding of, and enabling description for, these examples of the system. However, one skilled in the art will understand that the system may be practiced without these details. In other instances, well-known structures and functions have not been shown or described in detail to avoid unnecessarily obscuring the description of the examples of the system.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

Referring to FIG. 1, a block diagram illustrating components of a data stream utilized by a suitable data storage and recovery system, such as a system that performs block-based and/or chunk-based data migration, is shown. The stream 110 may include a client 111, a media agent 112, and a secondary storage device 113. For example, in storage operations, the system may store, receive and/or prepare data, such as blocks or chunks, to be stored, copied or backed up at a server or client 111. The system may then transfer the data to be stored to media agent 112, which may then refer to storage policies, schedule policies, and/or retention policies (and other policies) to choose a secondary storage device 113. The media agent 112 may include or be associated with an intermediate component, to be discussed herein.

The secondary storage device 113 receives the data from the media agent 112 and stores the data as a secondary copy, such as a backup copy. Secondary storage devices may be magnetic tapes, optical disks, USB and other similar media, disk and tape drives, and so on. Of course, the system may employ other configurations of stream components not shown in the Figure.

Figure 2:
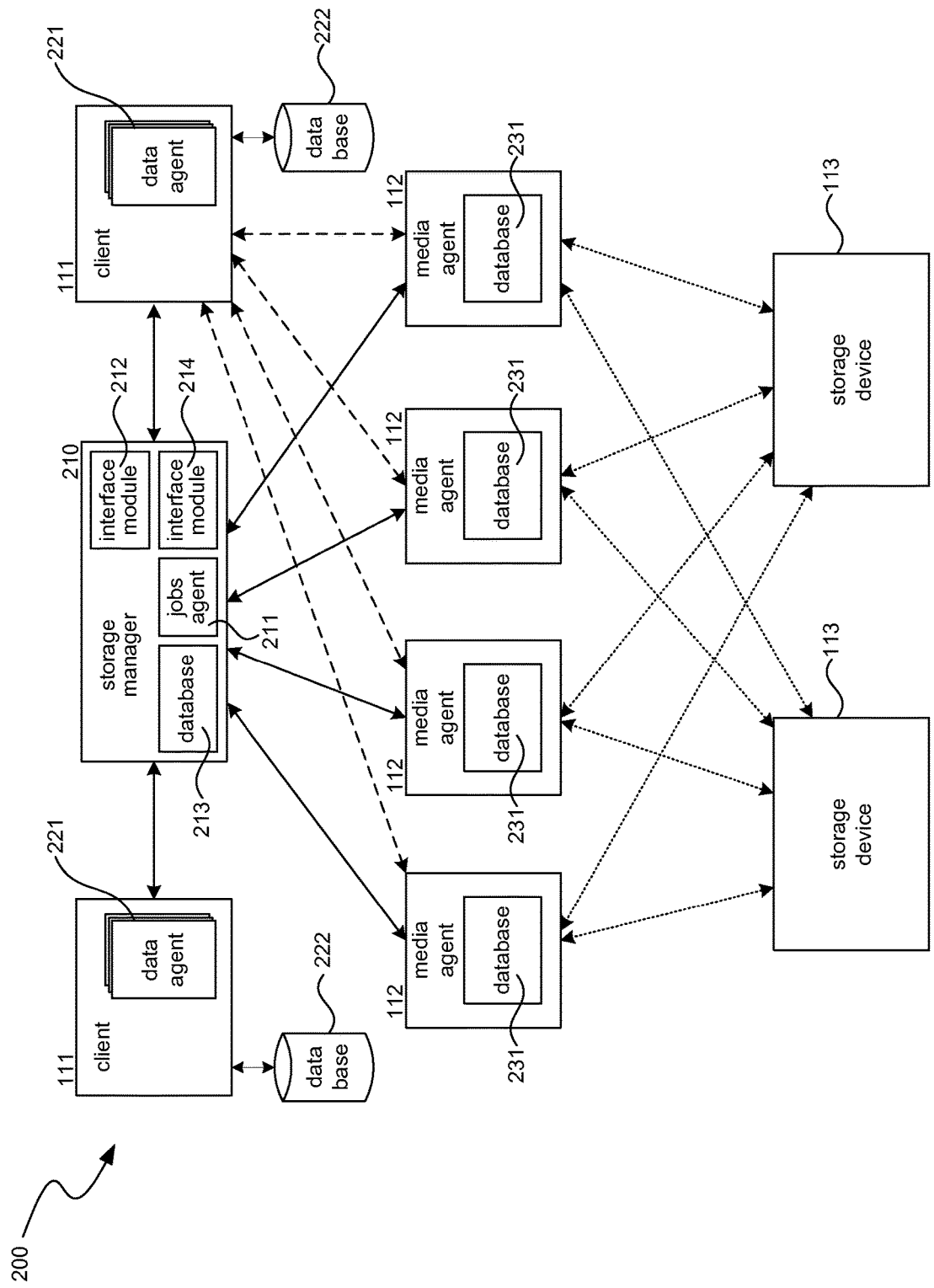
FIG. 2 is a block diagram illustrating an example of a data storage system.

Referring to FIG. 2, a block diagram illustrating an example of a data storage and recovery system 200 is shown. Data storage systems may contain some or all of the following components, depending on the needs of the system. FIG. 2 and the following discussion provide a brief, general description of a suitable computing environment in which the system can be implemented. Although not required, aspects of the system are described in the general context of computer-executable instructions, such as routines executed by a general-purpose computer, e.g., a server computer, wireless device or personal computer. Those skilled in the relevant art will appreciate that the system can be practiced with other communications, data processing, or computer system configurations, including: Internet appliances, network PCs, mini-computers, mainframe computers, and the like. Indeed, the terms "computer," "host," and "host computer" are generally used interchangeably herein, and refer to any of the above devices and systems, as well as any data processor.

Aspects of the system can be embodied in a special purpose computer or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), Storage Area Network (SAN), Fibre Channel, or the Internet. In a distributed computing environment, program modules may be located in both local and remote memory storage devices.

Aspects of the system may be stored or distributed on computer-readable media, including tangible storage media, such as magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer, and thus, while certain hardware platforms are described herein, aspects of the system are equally applicable to nodes on a network.

For example, the data storage system 200 contains a storage manager 210, one or more clients 111, one or more media agents 112, and one or more storage devices 113. Storage manager 210 controls media agents 112, which may be responsible for transferring data to storage devices 113. Storage manager 210 includes a jobs agent 211, a management agent 212, a database 213, and/or an interface module 214. Storage manager 210 communicates with client(s) 111. One or more clients 111 may access data to be stored by the system from database 222 via a data agent 221. The system uses media agents 112, which contain databases 231, to transfer and store data into storage devices 113. Client databases 222 may contain data files and other information, while media agent databases may contain indices and other data structures that store the data at secondary storage devices, for example.

The data storage and recovery system may include software and/or hardware components and modules used in data storage operations. The components may be storage resources that function to copy data during storage operations. The components may perform other storage operations (or storage management operations) other that operations used in data stores. For example, some resources may create, store, retrieve, and/or migrate primary or secondary data copies of data. Additionally, some resources may create indices and other tables relied upon by the data storage system and other data recovery systems. The secondary copies may include snapshot copies and associated indices, but may also include other backup copies such as HSM copies, archive copies, auxiliary copies, and so on. The resources may also perform storage management functions that may communicate information to higher level components, such as global management resources.

In some examples, the system performs storage operations based on storage policies, as mentioned above. For example, a storage policy includes a set of preferences or other criteria to be considered during storage operations. The storage policy may determine or define a storage location and/or set of preferences about how the system transfers data to the location and what processes the system performs on the data before, during, or after the data transfer. In some cases, a storage policy may define a logical bucket in which to transfer, store or copy data from a source to a data store, such as storage media. Storage policies may be stored in storage manager 210, or may be stored in other resources, such as a global manager, a media agent, and so on. Further details regarding storage management and resources for storage management will now be discussed.

Figure 3:
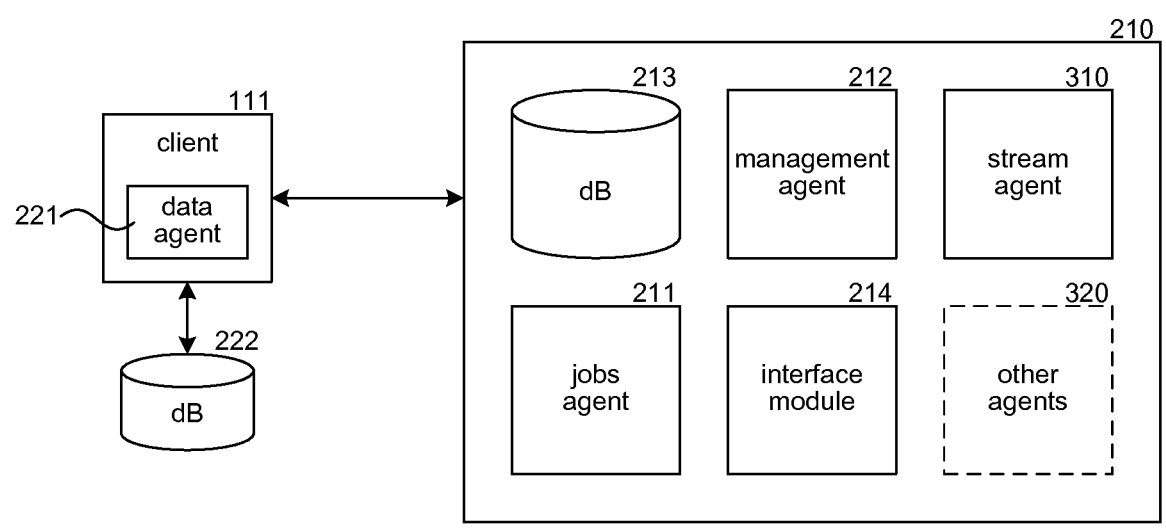
FIG. 3 is a block diagram illustrating an example of components of a server used in data storage operations.

Referring to FIG. 3, a block diagram illustrating an example of components of a server used in data storage operations is shown. A server, such as storage manager 210, may communicate with clients 111 to determine data to be copied to storage media. As described above, the storage manager 210 may contain a jobs agent 211, a management agent 212, a database 213, and/or an interface module. Jobs agent 211 may manage and control the scheduling of jobs (such as copying data files) from clients 111 to media agents 112. Management agent 212 may control the overall functionality and processes of the data storage system, or may communicate with global managers. Database 213 or another data structure may store storage policies, schedule policies, retention policies, or other information, such as historical storage statistics, storage trend statistics, and so on. Interface module 215 may interact with a user interface, enabling the system to present information to administrators and receive feedback or other input from the administrators or with other components of the system (such as via APIs).

In some examples, the system performs some or all the operations described herein using an intermediate component, virtual storage device, virtual device driver, virtual disk driver, or other intermediary capable of mounting to a file system and communicating with a storage device. That is, an intermediate component may communicatively reside between a file system and a primary data store that contains data created by the file system and a secondary data store. The intermediate component enables flexibility during data restoration, enabling a file system to indirectly access a secondary copy of data in order to identify information associated with data stored by the secondary copy, among other benefits.

Data Migration System

Figure 4:
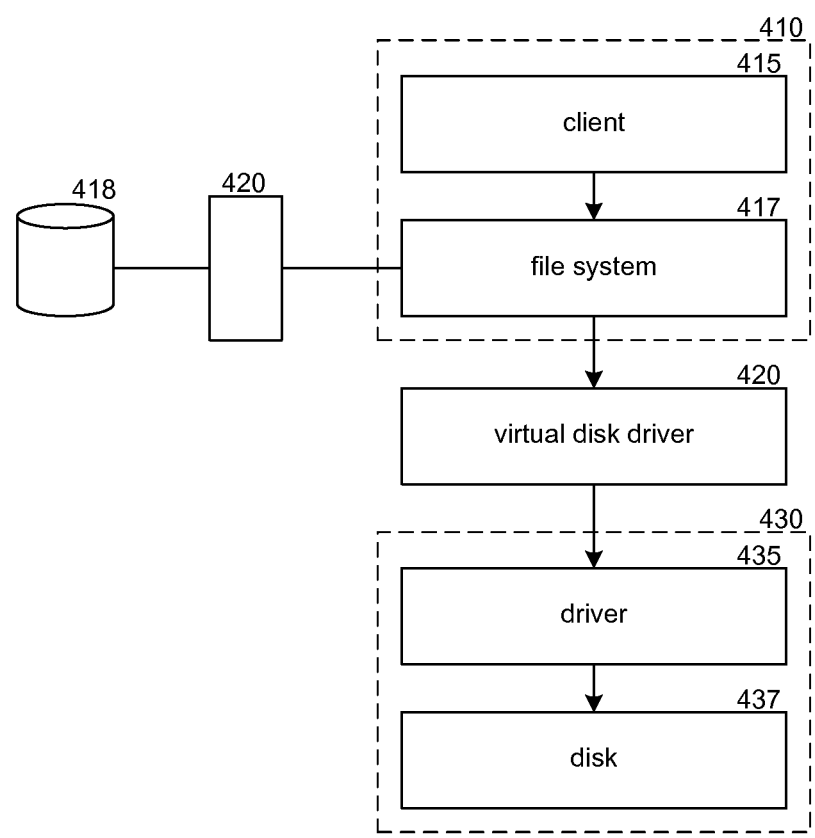
FIG. 4 is a block diagram illustrating a system for performing increment-based data migration.

Referring to FIG. 4, a block diagram illustrating a system for performing portion-based data migration is shown. The system components include a data creation and/or modification component 410, an intermediate component 420, and a data storage component 430. The restore component 410 may include a client portion 415, such as a client portion that receives input from users. A file system 417, as discussed herein, may organize and provide data to applications, user interfaces, and so on to the user, among other things. The file system creates, updates, modifies, and/or removes data from a data store, based on input from users. The file system 417 may store the created data in one or more data stores, such as a local database 418 that provides primary storage. For example, the database 418 may be a hard drive or hard disk that stores data produced by the file system as primary copies or production copies of the data. The system components may also include an intermediate component 420 (further described herein), such as a virtual disk driver. The intermediate component 420 communicates with a disk driver 435 and mounted disk 437, which together may act as the data storage component 430. Additionally, the intermediate component 420 may be located between the file system 417 and database 418. The data storage component provides secondary storage, and may store secondary copies of data generated by the file system 417, such as secondary copies of primary copies stored in database 418.

Figure 5:
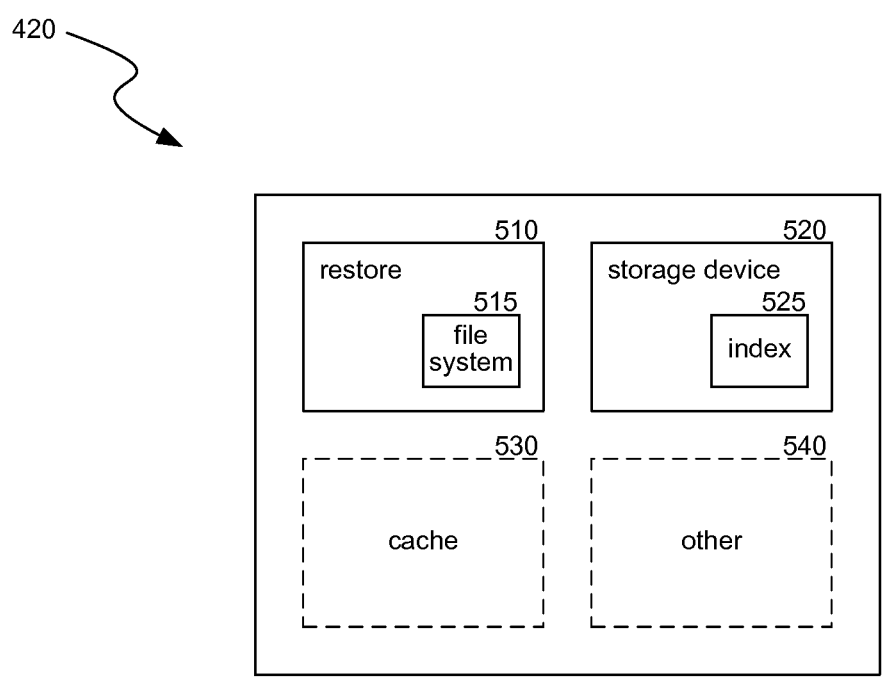
FIG. 5 is a block diagram illustrating the intermediate component of FIG. 4.

Referring to FIG. 5, a block diagram illustrating the intermediate component 420 of FIG. 4 is shown. The intermediate component 420 includes a restore module 510 that may contain its own file system 515. The restore module 510 (or component, sub-system, and so on), may communicate with a file system, such as the file system 417. Further details with respect the functionality of the restore module 510 is described herein.

The intermediate component 420 may also include a storage device module 520 that communicates with storage devices, such as disk driver 435 and disk 437 (or other fixed or removable media). The storage device module 520 may include an index 525 or allocation table that identifies available media for data storage, contains information associated with data stored via the intermediate component 420, and so on.

The intermediate component 420 may also include a cache 530 (or, a cache module or interface that communicates with an external cache), and/or other agents or modules 540, such as modules that index files, classify files, manage files or information, and so on.

Block-Based Data Migration

Block-level migration, or block-based data migration, involves migrating disk blocks from a primary data store (e.g., a disk partition) to secondary media. Using block-level migration, a data storage system transfers blocks on a disk partition that have not been recently accessed to secondary storage, freeing up space on the disk. In order to expand the database, the system moves data from the database to other locations, such as other databases or storage locations. Typically, such expansion requires knowledge of the database, such as the database application, the database schema, and so on. However, using block-level migration, the system can expand or extend a database without any knowledge of the applications or schema of the database, providing for transparent migration and/or restoration of data from one storage location to another. This can be helpful when migrating data from virtual machines that contain large files, (e.g., large files created by applications such as Vmware, Microsoft Virtual Server, and so on). The system may implement block-level migration processes as software device drivers, but may also implement block-level migration in disk hardware.

Figures 6A, 6B:
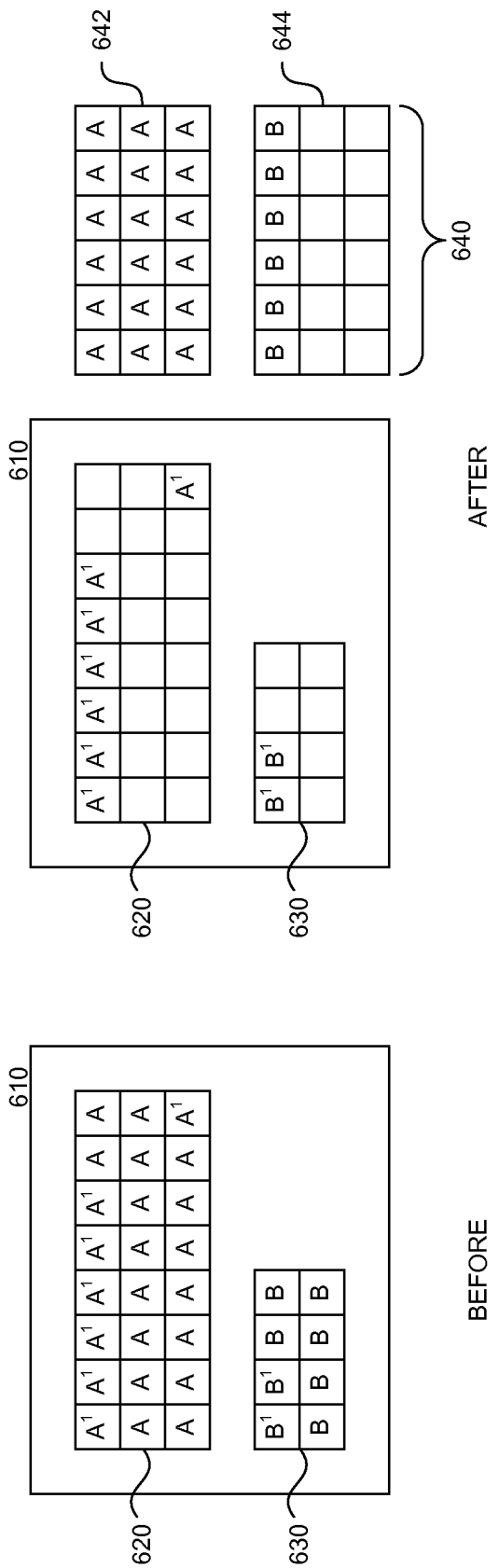
FIGS. 6A and 6B are schematic diagrams illustrating a data store before and after a block-based data migration, respectively.

As described herein, the system can transfer or migrate certain blocks of a data object from one data store to another, such as from primary storage that contains a primary copy of the data object to secondary storage that contains or will contain a secondary copy of the primary copy of the data object. Referring to FIGS. 6A-6B, a schematic diagram illustrating contents of two data stores before and after a block-based data migration is shown. In FIG. 6A, a first data store 610 contains primary copies (i.e., production copies) of two data objects, a first data object 620 and a second data object 630. The first data object comprises blocks A and $A^1$, where blocks A are blocks that satisfy or meet certain storage criteria (such as blocks that have not been modified since creation or not been modified within a certain period of time) and blocks A' are blocks that do not meet the criteria (such as blocks that have been modified within the certain time period). The second data object comprises blocks B and B', where blocks B satisfy the criteria and blocks B' do not meet the criteria.

FIG. 6B depicts the first data store 610 after a block-based data migration of the two data objects 620 and 630. In this example, the system only transfers the data from blocks that satisfy a criteria (blocks A and B) from the first data store 610 to a second data store 640, such as secondary storage 642, 644. The secondary storage may include one or more magnetic tapes, one or more optical disks, and so on. The system maintains data in the remaining blocks (blocks A' and B') within the first data store 610.

The system can perform file system data migration at a block level, unlike previous systems that only migrate data at the file level (that is, they have a file-level granularity). By tracking migrated blocks, the system can also restore data at the block level, which may avoid cost and time problems associated with restoring data at the file level or may assist in defragmenting a storage device. Further details regarding the block-level restoration of data is be discussed herein.

Figure 7:
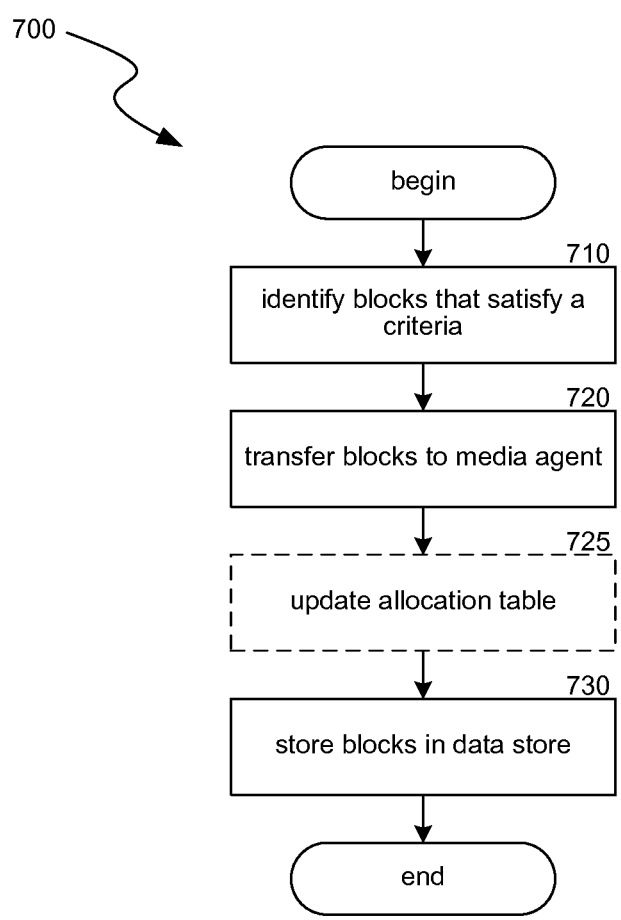
FIG. 7 is a flow diagram illustrating a routine for performing block-level data migration.

Referring to FIG. 7, a flow diagram illustrating a routine 700 for performing block-level data migration is shown. In step 710, the system identifies data blocks within a data store that satisfy a certain criteria. The system may track data blocks and access the blocks via APIs. The data store may be a database associated with a file system, a SQL database, a Microsoft Exchange mailbox, and so on. The system may compare some or all of the blocks (or, information associated with the blocks) of the data store with predetermined criteria. The predetermined criteria may be time-based criteria within a storage policy or data retention policy.

In some examples, the system identifies blocks set to be "aged off" from the data store. That is, the system identifies blocks created, changed, or last modified before a certain date and time. For example, the system may review a data store for all data blocks that satisfy a criterion or criteria. The data store may be an electronic mailbox or personal folders (.pst) file for a Microsoft Exchange user, and the criterion may define, for example, all blocks or emails last modified or changed thirty days ago or earlier. The system compares information associated with the blocks, such as metadata associated with the blocks, to the criteria, and identifies all blocks that satisfy the criteria. For example, the system identifies all blocks in the .pst file not modified within the past thirty days. The identified blocks may include all the blocks for some emails and/or a portion of the blocks for other emails. That is, for a given email (or data object), a first portion of the blocks that include the email may satisfy the criteria, while a second portion of the blocks that include the same email may not satisfy the criteria. In other words, a file or a data object can be divided into parts or portions, and only some of the parts or portions change.

To determine which blocks have changed, and when, the system can monitor the activity of the file system via the intermediate component 420, (e.g., the virtual device driver). The system may store a data structure, such as a bitmap, table, log, and so on within the cache 530 or other memory of the intermediate component 420, and update the bitmap whenever the file system calls the database 418 to access and update or change data blocks within the database 418. The intermediate component 420 traps the command to the disk driver, where that command identifies certain blocks on a disk for access or modifications, and writes to the bitmap the changed blocks and the time of the change. The bitmap may include information such as an identification of changed blocks and a date and a time the blocks were changed. The bitmap, which may be a table, data structure, or group of pointers, such as a snapshot, may also include other information, such as information that maps file names to blocks, information that maps chunks to blocks and/or file names, and so on. Table 1 provides entry information for a bitmap tracking the activity of a file system with the "/users" directory:

TABLE 1

| Blocks | Date and Time Modified |
| --- | --- |
| /users/blocks1-100 | 09.08.2008 @14:30 |
| /users/blocks101-105 | 09.04.2008 @12:23 |
| /users2/blocks106-110 | 09.04.2008 @11:34 |
| /users3/blocks110-1000 | 08.05.2008 @10:34 |

Thus, if a storage policy identified the time 08.30.2008@12:00 as a threshold time criteria, where data modified after the time is to be retained, the system would identify, in step 710, blocks 110-1000 as having satisfied the criteria. Thus, the system, via the intermediate component 420, can monitor what blocks are requested by a file system, and act accordingly, as described herein.

In step 720, the system transfers data within the identified blocks from the data store to a media agent, to be stored in a different data store. The system may perform some or all of the processes described with respect to FIGS. 1-3 when transferring the data to the media agent. For example, before transferring data, the system may review a storage policy as described herein to select a media agent, such as media agent 112, based on instructions within the storage policy. In step 725, the system optionally updates an allocation table, such as a file allocation table (FAT) for a file system associated with the data store, to indicate the data blocks that no longer contain data and are now free to receive and store data from the file system.

In step 730, via the media agent, the system stores data from the blocks to a different data store. In some cases, the system, via the media agent, stores the data from the blocks to a secondary storage device, such as a magnetic tape or optical disk. For example, the system may store the data from the blocks in secondary copies of the data store, such as a backup copy, an archive copy, and so on. In some cases, the system stores the data from the blocks to a storage device located near and/or associated with the data store, such as to a quick recovery volume that facilitates quick restores of data.

The system may create, generate, update, and/or include an allocation table, (such as a table for the data store) that tracks the transferred data and the data that was not transferred. The table may include information identifying the original data blocks for the data, the name of the data object, the location of any transferred data blocks, and so on. For example, Table 2 provides entry information for an example .pst file:

TABLE 2

| Name of Data Object | Location of data |
| --- | --- |
| Email1 | C:/users/blocks1-100 |
| Email2.1 (body of email) | C:/users/blocks101-120 |
| Email2.2 (attachment) | X:/remov1/blocks1-250 |
| Email3 | X:/remov2/blocks300-500 |

In the above example, the data for "Email2" is stored in two locations, a local data store (C:/) and an off-site data store (X:/). The system maintains the body of the email, recently modified or accessed, at a location within a data store associated with a file system, "C:/users/blocks101-120." The system stores the attachment, not recently modified or accessed, in a separate data store, "X:/remov1/blocks1-250." Of course, the table may include other information, fields, or entries not shown. For example, when the system stored data to tape, the table may include tape identification information, tape offset information, and so on.

Chunk-Based Data Migration

Chunked file migration, or chunk-based data migration, involves splitting a data object into two or more portions of the data object, creating an index that tracks the portions, and storing the data object to secondary storage via the two or more portions. Among other things, the chunk-based migration provides for fast and efficient storage of a data object. Additionally, chunk-based migration facilitates fast and efficient recall of a data object, such as the large files described herein. For example, if a user modifies a migrated file, chunk-based migration enables a data restore component to only retrieve from, and migrate back to, secondary storage the chunk containing the modified portion of the file, and not the entire file. In some cases, chunk-based migration may collaborate with components that provide file format and/or database schema information in order to facilitate data recovery.

Figure 8:
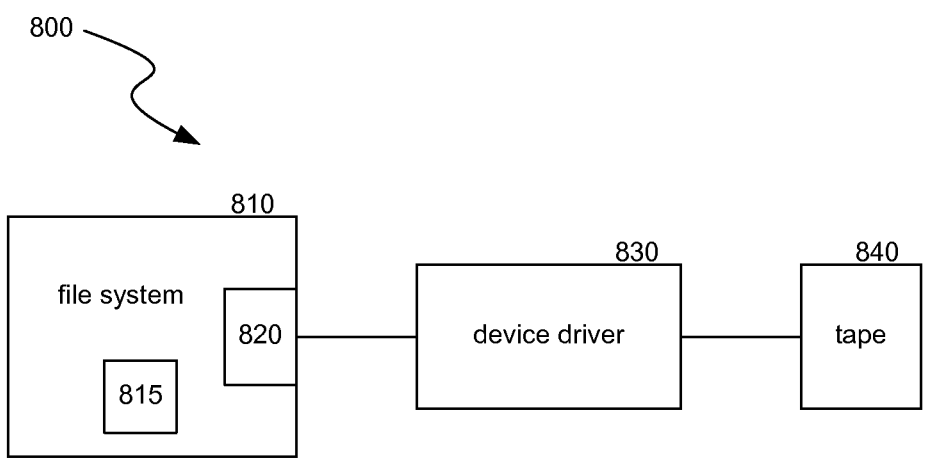
FIG. 8 is a block diagram illustrating a system for providing chunk-based data migration and/or restoration.

As described above, in some examples the system migrates chunks of data (sets of blocks) that comprise a data object from one data store to another. Referring to FIG. 8, a block diagram illustrating a system 800 for providing chunk-based data migration and/or restoration is shown. The system 800 includes a file system 810, a callback layer 820, which interacts with the file system, and a device driver 830, which reads from and writes data to a data store 840 such as removable media including magnetic tapes, optical disks, and so on. Further details with respect to the callback layer 820 will be described herein.

As described above, the system migrates data via one or more chunks, such as sets of blocks. A data object, such as a file, may comprise two or more chunks. A chunk may be a logical division of a data object. For example, a .pst file may include two or more chucks: a first chunk that stores data associated with an index of a user's mailbox, and one or more chunks that stores email, attachments, and so on within the user's mailbox. A chunk is a proper subset of all the blocks comprising a file. That is, for a file consisting of n blocks, the largest chunk of the file comprises at most n−1 blocks.

The system 800 may include a chunking component 815 that divides data objects, such as files, into chunks. The chunking component 815 may receive files to be stored in database 418, divide the files into two or more chunks, and store the files as two or more chunks in database 418. The chunking component 815 may update an index that associated information associated with files with the chunks of the file, the data blocks of the chunks, and so on.

The chunking component 815 may perform different processes when determining how to divide a data object. For example, the chunking component 815 may include indexing, header, and other identifying information or metadata in a first chunk, and include the payload in other chunks. The chunking component 815 may follow a rules-based process when dividing a data object. The rules may define a minimum or maximum data size for a chunk, a time of creation for data within a chunk, a type of data within a chunk, and so on.

For example, the chunking component 815 may divide a user mailbox (such as a .pst file) into a number of chunks, based on various rules that assign emails within the mailbox to chunks based on the metadata associated with the emails. The chunking component 815 may place an index of the mailbox in a first chunk and the emails in other chunks. The chunking component 815 may then divide the other chunks based on dates of creation, deletion or reception of the emails, size of the emails, sender of the emails, type of emails, and so on. Thus, as an example, the chunking component may divide a mailbox as follows:

| | |
|---|---|
| User1/Chunk1 | Index |
| User1/Chunk2 | Sent emails |
| User1/Chunk3 | Received emails |
| User1/Chunk4 | Deleted emails |
| User1/Chunk5 | All Attachments. |

Of course, other divisions are possible. Chunks may not necessarily fall within logical divisions. For example, the chunking component may divide a data object based on information or instructions not associated with the data object, such as information about data storage resources, information about a target secondary storage device, historical information about previous divisions, and so on.

The system may perform chunking at various times or in different locations of a data storage system. For example, although FIG. 8 shows the chunking component 815 at file system 810, the system may locate the chunking component at the device driver 830, at an intermediate component, or other locations. In some cases, the system may utilize the chunking component 815 to divide data already in secondary storage into chunks. For example, a data storage system may retrieve data objects under management that were transferred to secondary storage using file-based data migration, divide the data objects into two or more chunks, and migrate the data objects based to storage using the chunk-based data migration discussed herein. Thus, future restoration of the data objects may be faster and easier because the data objects are divided into chunks.

Figure 9:
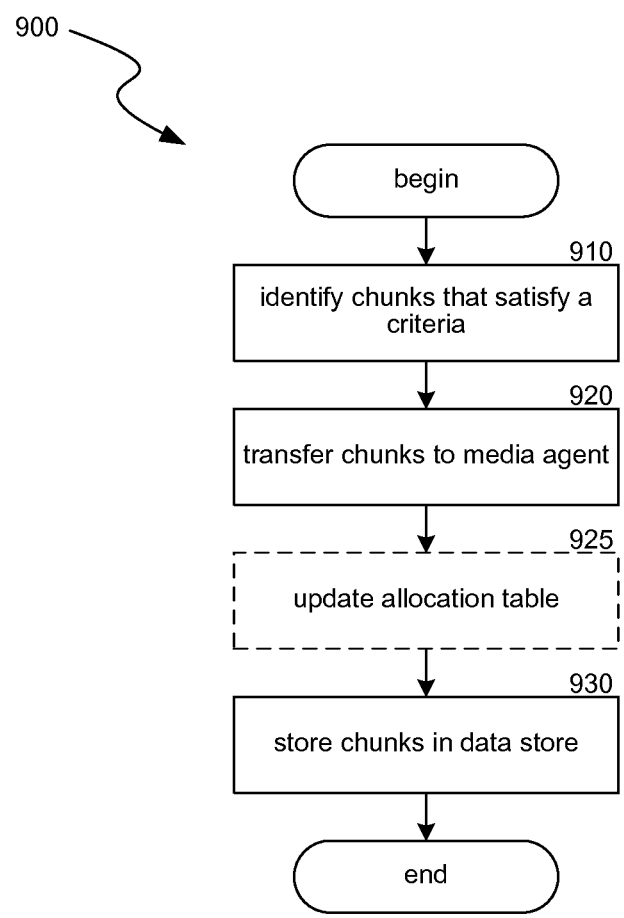
FIG. 9 is a flow diagram illustrating a routine for performing chunk-level data migration.

Referring to FIG. 9, a flow diagram illustrating a routine 900 for performing chunk-level data migration is shown. In step 910, the system identifies chunks of data blocks within a data store that satisfy one or more criteria. The data store may store large files (>50 MB), such as databases associated with a file system, SQL databases, Microsoft Exchange mailboxes, virtual machine files, and so on. The system may compare some or all of the chunks (or, information associated with the chunks) of the data store with predetermined and/or dynamic criteria. The predetermined criteria may be time-based criteria within a storage policy or data retention policy. The system may review an index with the chunking component 815 when comparing the chunks with applicable criteria.

In step 920, the system transfers data within the identified chunks from the data store to a media agent, to be stored in a different data store. The system may perform some or all of the processes described with respect to FIGS. 1-3 when transferring the data to the media agent. For example, the system may review a storage policy assigned to the data store and select a media agent based on instructions within the storage policy. In step 925, the system optionally updates an allocation table, such as a file allocation table (FAT) for a file system associated with the data store, to indicate the data blocks that no longer contain data and are now free to receive and store data from the file system.

In some examples, the system monitors the transfer of data from the file system to the data store via the callback layer 820. The callback layer 820 may be a layer, or additional file system, that resides on top of the file system 810. The intermediate layer 820 may intercept data requests from the file system 810, in order to identify, track and/or monitor the chunks requested by the file system 810 and store information associated with these requests in a data structure, such as a bitmap similar to the one shown in Table 1. Thus, the intermediate layer 820 stores information identifying when chunks are accessed by tracking calls from the file system 810 to the data store 840. For example, Table 3 provides entry information for a bitmap tracking calls to a data store:

TABLE 3

| Chunk of File1 | Access Time |
|---|---|
| File1.1 | 09.05.2008 @12:00 |
| File1.2 | 09.05.2008 @12:30 |
| File1.3 | 09.05.2008 @13:30 |
| File1.4 | 06.04.2008 @12:30 |

In this example, the file system 810 creates a data object named "File1," using the chunking component to divide the file into four chunks: "File1.1," "File1.2," "File1.3," and "File1.4." The file system 810 stores the four chunks to data store 840 on 06.04.2008. According to the table, the file system has not accessed File1.4 since its creation, and most recently accessed the other chunks on Sep. 5, 2008. Of course, Table 3 may include other or different information, such as information identifying a location of the chunks, information identifying the type of media storing the chunks, information identifying the blocks within the chunk, and/or other information or metadata.

In step 930, via the media agent, the system stores the data from the chunks to a different data store. In some cases, the system, via the media agent, stores the data to a secondary storage device, such as a magnetic tape or optical disk. For example, the system may store the data in secondary copies of the data store, such as a backup copy, and archive copy, and so on. In some cases, the system stores the data to a storage device located near and/or associated with the data store, such as to a quick recovery volume.

Data Recovery

Figure 10:
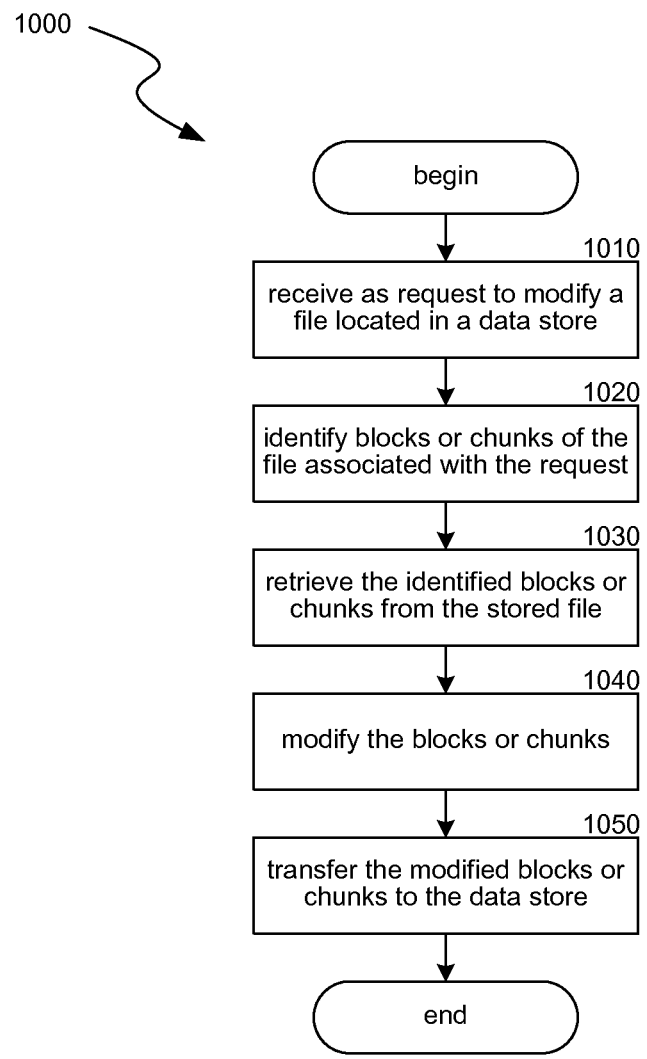
FIG. 10 is flow diagram illustrating a routine for block-based or chunk-based data restoration and modification.

The system, using the block-based or chunk-based data migration processes described herein, is able to restore portions of files instead of entire files, such as individual blocks or chunks that comprise portions of the files. Referring to FIG. 10, a flow diagram illustrating a routine 1000 for block-based or chunk-based data restoration and modification is shown. In step 1010, the system, via a restore or data recovery component, receives a request to modify a file located in a data store. For example, a user submits a request to a file system to provide an old copy of a large Powerpoint presentation so the user can modify a picture located on slide 5 of 300 of the presentation. For example, the data recovery component 410 works with the file system 417 and the data store 430.

In step 1020, the system identifies one or more blocks or one or more chunks associated with the request. For example, the system looks to a table similar to Table 2, and identifies blocks associated with page 5 of the presentation and blocks associated with an table of contents of the presentation.

In step 1030, the system retrieves the identified blocks or chunks and presents them to the user. For example, the system only retrieves page 5 and table of contents of the presentation and presents the pages to the user.

In step 1040, the system, via the file system, modifies the retrieved blocks or chunks via the file system. For example, the user updates the Powerpoint presentation to include a different picture. In step 1050, the system transfers data associated with the modified blocks or chunks to the data store. For example, the system transfers the modified page 5 to the data store. The system may also update a table that tracks access to the data store, such as Table 1 or Table 3.

Thus, the system, leveraging block-based or chunk-based data migration during data storage, restores only portions of data objects required by a file system. Such restoration can be, among other benefits, advantageous over systems that perform file-based restoration, because those systems restore entire files, which can be expensive, time consuming, and so on. Some files, such as .pst files, may contain large amounts of data. File-based restoration can therefore be inconvenient and cumbersome, among other things, especially when a user only requires a small portion of a large file.

For example, a user submits a request to the system to retrieve an old email stored in a secondary copy on removable media. The system identifies a portion of a .pst file associated with the user that contains a list of old emails, and retrieves the list. That is, the system has knowledge of the chunk that includes the list (e.g., a chunking component may always include the list in a first chunk of a data object), accesses the chunk, and retrieves the list. The other portions (e.g., all the emails with the .pst file), are not retrieved from media. The user selects the desired email from the list. The system, via an index that associates chunks with data (such as an index similar to Table 2), identifies the chunk that contains the email, and retrieves the chunk for presentation to the user. The index may include information about the chunks, information about the data objects (such as file formats, database schemas, application specific information, and so on).

Thus, the system is able to restore the email without restoring the entire mailbox (.pst file) associated with the user. That is, although an entire data object is in storage, the system is able to retrieve a portion of the entire data object by leveraging the processes described herein.

Conclusion

From the foregoing, it will be appreciated that specific examples of the data recovery system have been described herein for purposes of illustration, but that various modifications may be made without deviating from the spirit and scope of the system. For example, although files have been described, other types of content such as user settings, application data, emails, and other data objects can be imaged by snapshots. Accordingly, the system is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the system provided herein can be applied to other systems, not necessarily the system described above. The elements and acts of the various embodiments described above can be combined to provide further embodiments.

These and other changes can be made to the system in light of the above Detailed Description. While the above description details certain embodiments of the system and describes the best mode contemplated, no matter how detailed the above appears in text, the system can be practiced in many ways. Details of the system may vary considerably in implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the applicant contemplates the various aspects of the system in any number of claim forms. For example, while only one aspect of the system is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the system.

I claim:

1. At least one non-transitory, computer-readable storage medium comprising instructions, which when executed by at least one data processor, enable restoration from secondary storage of a portion of a file in a data storage system, comprising:
   receiving, via a user interface associated with a file system, a request from a user to modify a portion of a file in the file system,
      wherein the file is partially stored in secondary storage on a second storage device that is distinct from a first storage device storing the file system;
   identifying one or more data blocks within the second storage device that contain data associated with the portion of the file requested to be modified;
   retrieving from the second storage device the one or more data blocks without retrieving data blocks therefrom that are not associated with the portion of the file requested to be modified;
   presenting to the user data contained by the one or more data blocks retrieved from the second storage device, via the user interface associated with the file system;
   upon receiving input from the user to modify the portion of the file, transferring data associated with the received input for storage by one of the first storage device and the second storage device; and
   maintaining a data structure in a memory of an intermediate component that resides between the file system and the second storage device, wherein the data structure reflects information about changes to the file, including information about data blocks that were changed by the received input to modify the portion of the file.

2. The at least one non-transitory, computer-readable storage medium of claim 1, wherein the data structure comprises one or more of: a bitmap, a table, and a log.

3. The at least one non-transitory, computer-readable storage medium of claim 1, wherein the identified one or more data blocks are a proper subset of a set of data blocks that contain file data.

4. The at least one non-transitory, computer-readable storage medium of claim 1, wherein the identifying one or more data blocks identifies one or more chunks within the second storage device.

5. The at least one non-transitory, computer-readable storage medium of claim 1, further comprising:
   dividing data already stored in the second storage device into subsets of data based on logical divisions including one or more of: a date of creation, a date of deletion, a date of reception, and a size of data to be divided; and
   updating an index associated with the file to include information associating the identified one or more data blocks with the second storage device.

6. A method in a data storage system for restoring a portion of a file, the method comprising:
   receiving, via a user interface associated with a file system that comprises a file, a request from a user to modify only a portion of the file in the file system,
      wherein the file is partially stored in secondary storage on a second storage device that is distinct from a first storage device storing the file system;
   determining one or more data blocks stored within the second storage device that contain data associated with the portion of the file requested to be modified;
   retrieving from the second storage device the one or more data blocks that contain data associated with the portion of the file requested to be modified without retrieving data blocks therefrom that are not associated with the portion of the file requested to be modified;
   in response to the request, presenting to the user via the user interface associated with the file system one or more data blocks retrieved from the second storage device;
   upon receiving input from the user, via the user interface, to modify the portion of the file, transferring data blocks that were changed by the received input for storage by one of the first storage device and the second storage device; and
   maintaining a data structure in a memory of an intermediate component that resides between the file system and the second storage device, wherein the data structure reflects information about changes to the file, including information about data blocks that were changed by the received input to modify the portion of the file.

7. The method of claim 6, wherein the data structure at the intermediate component comprises a bitmap.

8. The method of claim 6, wherein the identified one or more data blocks are a proper subset of a set of data blocks that contain file data.

9. The method of claim 6, wherein the identifying one or more data blocks identifies one or more chunks within the second storage device.

10. The method of claim 6, further comprising:
dividing data already stored in the second storage device into subsets of data based on logical divisions including one or more of: a date of creation, a date of deletion, a date of reception, and a size of data to be divided; and
updating an index associated with the file to include information associating the identified one or more data blocks with the storage device.

11. A system for restoring a portion of a file, the system comprising:
at least one processor;
means, at a file system, for receiving a request from a user to modify only a portion of a file in the file system, wherein the file is partially stored in secondary storage on a second storage device that is distinct from a first storage device storing the file system;
means for identifying one or more data blocks stored within the second storage device that contain data associated with the portion of the file requested to be modified;
means for retrieving from the second storage device the one or more data blocks without retrieving data blocks therefrom that are not associated with the portion of the file requested to be modified;
means for presenting in a user interface the portion of the file requested to be modified, including the data blocks retrieved from the second storage device;
means for transferring data blocks that were changed by input received from the user to modify the portion of the file, for storage by one or more of the first storage device and the second storage device; and
means for maintaining a data structure in a memory of an intermediate component that resides between the file system and the second storage device, wherein the data structure reflects information about changes to the file, including information about data blocks that were changed by the input to modify the portion of the file.

12. The system of claim 11, wherein the identified one or more data blocks are a proper subset of a set of data blocks that contain file data.

13. The system of claim 11, wherein the means for identifying one or more data blocks identifies one or more chunks within the second storage device.

14. The system of claim 11, wherein the data structure is configured as a bitmap.

15. The system of claim 11, further comprising:
means for dividing data already stored in the second storage device into subsets of data based on logical divisions including one or more of: a date of creation, a date of deletion, a date of reception, and a size of data to be divided; and
means for updating an index associated with the file to include information associating the identified one or more data blocks with the second storage device.

16. The system of claim 11, wherein the file is a slide presentation and wherein the data contained by the identified one or more data blocks includes data associated with a single slide of the slide presentation.

17. The system of claim 11, wherein the file is a .pst file for an email mailbox associated with the user and wherein the identified one or more data blocks comprise one or more emails within the .pst file.

* * * * *